United States Patent
Shuto et al.

[11] Patent Number: 6,139,785
[45] Date of Patent: Oct. 31, 2000

[54] CELLULOSE ESTER COMPOSITION

[75] Inventors: Yuichiro Shuto; Hiroki Taniguchi; Yukiko Nakanishi, all of Hyogo; Masahiko Murayama, Kanagawa, all of Japan

[73] Assignee: Daicel Chemical Industries, Ltd., Osaka, Japan

[21] Appl. No.: 09/273,054

[22] Filed: Mar. 19, 1999

[30] Foreign Application Priority Data

Mar. 23, 1998 [JP] Japan .................................. 10-074204

[51] Int. Cl.⁷ ............................... B29C 41/24; C08L 1/10
[52] U.S. Cl. .................... 264/207; 106/162.72; 264/217; 536/65; 536/68; 536/69
[58] Field of Search ................................ 264/217, 218, 264/207, 1.34, 211.11, 212; 106/162.7, 162.71, 162.72; 536/56, 58, 63, 69, 65, 68

[56] References Cited

U.S. PATENT DOCUMENTS

| | | | |
|---|---|---|---|
| 5,314,647 | 5/1994 | Rieth | 264/217 |
| 5,540,874 | 7/1996 | Yamada et al. | 106/162.71 |
| 5,594,068 | 1/1997 | Buchanan et al. | |
| 5,686,036 | 11/1997 | Arrington | 264/217 |
| 5,695,694 | 12/1997 | Iwata et al. | 264/217 |

FOREIGN PATENT DOCUMENTS

| | | |
|---|---|---|
| 5-17844 | 10/1993 | Japan . |
| 8-231761 | 9/1996 | Japan . |
| 10-045804 | 2/1998 | Japan . |
| 10-060170 | 3/1998 | Japan . |

OTHER PUBLICATIONS

Aliphatic Acid Esters of Cellulose Properties by C.J. Malm et al, *Industrial and Engineering Chemistry*, vol. 43, No. 3, pp. 688–691.

*Primary Examiner*—Mathieu D. Vargot
*Attorney, Agent, or Firm*—Flynn, Thiel, Boutell & Tanis, P.C.

[57] ABSTRACT

The present invention provides a cellulose ester composition, containing 1 to 99% by weight of cellulose triacetate prepared by substituting hydroxyl groups of cellulose with acetyl and having a degree of substitution with acetyl, DSace, which satisfies the relationship: $2.7 \leq DSace \leq 3.0$, and 99 to 1% by weight of a mixed fatty acid ester of cellulose prepared by substituting hydroxyl groups of cellulose with acetyl and acyl groups having three or more carbon atoms and having degrees of substitution with acetyl and acyl groups having three or more carbon atoms, DSace and DSacyl, respectively, which satisfy the relationships: (I) $2.20 \leq DSace \leq 2.95$, (II) $0.05 \leq DSacyl \leq 0.80$ and (III) $2.60 \leq DSace+DSacyl \leq 3.00$.

14 Claims, 1 Drawing Sheet

CELLULOSE ESTER COMPOSITION

FIELD OF THE INVENTION

The present invention relates to a cellulose ester composition useful as a raw material for producing a film having excellent optical characteristics and mechanical properties. The present invention relates also to a liquid cellulose ester composition and a process for preparing the same. Additionally, the present invention also relates to a process for producing a cellulose ester film.

PRIOR ART

Cellulose acetate films are generally used as supports of photographic sensitive materials by virtue for their excellent toughness and flame retardance, or as protective films for polarizing plates for liquid crystal displays or color filters by virtue of their high optical isotropy. These cellulose acetate films are generally produced by solvent-casting or the melt-casting, and the former can give films having a better flatness than the latter. Although the flatness of a film can be improved by biaxial stretching, such stretching is causative of orienting the molecules to give a film having an enhanced optical anisotropy. In general, the employment of solvent-casting is desirable, because films to be used in the fields of photographic materials and optical materials are required, except for special ones, to exhibit optical isotropy.

Only methylene chloride has been substantially put into practical use as the solvent to be used for solvent-casting. From the standpoint of environmental protection, however, there is a tendency to limit the use of halogenated hydrocarbons, including methylene chloride. Further, methylene chloride has a low boiling point (41° C.) and is therefore liable to evaporate easily during the production of a film to thereby worsen the working atmosphere. Acetone and methyl acetate are known as general-purpose solvents and have high boiling points and therefore have little adverse effect on the environment as compared with methylene chloride, being and are preferable in this respect. However, cellulose acetates exhibit low solubilities in acetone or methyl acetate. In particular, cellulose triacetate having a degree of substitution of 2.80 (corresponding to a degree of acetylation of 60.1%) or above hardly dissolves in such a solvent at room temperature, though it is swollen therewith.

In order to solve these problems, research and development have been made to modify not only the solvent but the composition of the cellulose ester. For example, it is disclosed in C. J. Malm et al., Ind. Eng. Chem., 43, 688, 1951 that greater latitude is allowed in selecting the solvent for cellulose propionate or cellulose butyrate as compared with the selection thereof for cellulose acetate. Incidentally, cellulose propionate and cellulose butyrate are soluble even in ketones and esters. However, films made of cellulose propionate or cellulose butyrate have the problem of being inferior to cellulose acetate films in mechanical strength and endurance. Further, mixed fatty acid esters of cellulose such as cellulose acetate propionate and cellulose acetate butyrate are commercially available from, e.g., Eastman Chemical Co., and these cellulose esters are soluble even in general-purpose solvents such as acetone and methyl acetate. However, films made of these mixed fatty acid esters of cellulose are poor in mechanical strengths and endurance, so that they are actually sold for the purpose of coating only.

Further, other mixed fatty acid esters of cellulose are also proposed in JP-A 8-231761, wherein the total degree of substitution is 2.6 to 3.0, the degree of substitution with acetyl is 2.0 and 2.7, and that with acyls other than acetyl is 0.3 to 0.8. However, films made of the mixed fatty acid esters of cellulose which are chemically modified with an acyl group other than propionyl are poor in mechanical characteristics, particularly elastic modulus, and lowered in toughness due to the significant motion of the acyl group, and thus is unsuitable for photographic materials or optical materials.

It is conceivable that the properties of a mixed fatty acid ester of cellulose may be made to approximate those of cellulose triacetate by enhancing the degree of acetylation of the ester with a lowering in the degree of substitution with an acyl other than acetyl. However, these mixed fatty acid esters of cellulose are also insoluble in general-purpose solvents at room temperature, so that the application of solvent-casting thereto is impossible. Although it is also conceivable to blend cellulose triacetate with another polymer for modification, no polymer compatible with cellulose triacetate has been reported as yet.

DISCLOSURE OF THE INVENTION

The present invention aims at providing a cellulose ester composition which is easily soluble in general-purpose organic solvents and can give a film having excellent mechanical and optical characteristics by the solvent-casting method.

The present invention aims also at providing a liquid cellulose ester composition suitable for producing the above film and a process for preparing the composition.

Further, the present invention aims also at providing a process for producing a cellulose ester film, by which films suitably usable for photographic materials or optical materials can be produced.

The inventors of the present invention have made many studies with their attention directed to the point that when a mixture of cellulose triacetate with other components is used as the raw material for producing a film having excellent optical characteristics and mechanical properties, the components constituting the raw material must be not only easily soluble but also have an excellent compatibility with each other. As a result of the studies, they have found that a specific combination of cellulose triacetate with a mixed fatty acid ester of cellulose is easily soluble in general-purpose solvents and has an excellent in the compatibility, and the present invention has been accomplished on the basis of this finding.

Namely, the present invention relates to a cellulose ester composition, comprising 1 to 99% by weight of (a) cellulose triacetate prepared by substituting hydroxyl groups of cellulose with acetyl, having a degree of substitution with acetyl, DSace, which satisfies the relationship: $2.7 \leq DSace \leq 3.0$, and 99 to 1% by weight of (b) a mixed fatty acid ester of cellulose, prepared by substituting hydroxyl groups of cellulose with acetyl and acyl groups having three or more carbon atoms, having degrees of substitution with acetyl and acyl groups having three or more carbon atoms, DSace and DSacyl, respectively, which satisfy the relationships: (I) $2.20 \leq DSace \leq 2.95$, (II) $0.05 \leq DSacyl \leq 0.80$ and (III) $2.60 \leq DSace+DSacyl \leq 3.00$.

DETAILED DESCRIPTION OF THE INVENTION

First, an explanation will be made for the cellulose ester composition according to the present invention. The component (a) constituting the cellulose ester composition is cellulose triacetate prepared by substituting hydroxyl groups of cellulose with acetyl. In order to enhance the optical and mechanical characteristics of a film and the compatibility with the component (b), the cellulose triacetate is further required to have a degree of substitution with acetyl, DSace, which satisfies the relationship: $2.7 \leq DSace \leq 3.0$, preferably $2.72 \leq DSace \leq 2.95$.

From the standpoints of the compatibility of the component (a) with the component (b) and the optical and mechanical characteristics of a film made of the composition, the content of the component (a) in the cellulose ester composition is limited to 1 to 99% by weight, preferably 10 to 99% by weight, particularly preferably 30 to 95% by weight, still preferably 40 to 95% by weight.

The component (b) constituting the cellulose ester composition is a mixed fatty acid ester of cellulose prepared by substituting hydroxyl groups of cellulose with acetyl and acyl groups having three or more carbon atoms. In order to enhance the compatibility with the component (a) and the optical and mechanical characteristics of a film made from the composition, the mixed fatty acid ester is further required to have degrees of substitution with acetyl and acyl groups having three or more carbon atoms, DSace and DSacyl, which satisfy the relationships: (I) $2.20 \leq DSace \leq 2.95$, (II) $0.05 \leq DSacyl \leq 0.80$ and (III) $2.60 \leq DSace+DSacyl \leq 3.00$.

In the component (b), it is preferable that the acyl having three or more carbon atoms be propionyl or butyryl.

With respect to the component (b), the relationship (I) is preferably $2.25 \leq DSace \leq 2.95$, the relationship (II) is preferably $0.05 \leq DSacyl \leq 0.75$, and the relationship (III) is preferably $2.70 \leq DSace+DSacyl \leq 3.00$.

The mixed fatty acid ester of cellulose to be used as the component (b) can be prepared by a known processes. For example, it can be prepared by esterifying cellulose with a mixed organic acid comprising organic acids corresponding to acetyl and propionyl groups (i.e., acetic acid and propionic acid), or acid anhydrides thereof (i.e., acetic anhydride and propionic anhydride). After the completion of the substitution, if necessary, it may be subjected to hydrolysis (saponification) to regulate the degrees of substitution.

The amounts of the acetylating agent and propionylating agent to be used may be so selected that the degrees of substitution satisfy the relationships (I) to (III). When acid anhydrides are used as the acylating agents (in the above example, both an acetylating agent and a propionylating agent), an organic acid such as acetic acid is used as the solvent for the esterification and an acid such as sulfuric acid is used as the catalyst. When acid chlorides are used as the acylating agents, a basic compound is used as the catalyst. The amount of the solvent to be used in the esterification is preferably 100 to 1000 parts by weight, particularly preferably 200 to 600 parts by weight per 100 parts by weight of cellulose. The amount of the acid catalyst to be used is preferably 0.1 to 20 parts by weight, particularly preferably 0.4 to 10 parts by weight per 100 parts by weight of cellulose. The reaction temperature is preferably 10 to 120° C., particularly preferably 20 to 80° C.

After the completion of the reaction, the reaction mixture is subjected to separation by precipitation or other conventional means, washing and drying successively to give a mixed fatty acid ester of cellulose such as cellulose acetate propionate.

From the standpoints of the compatibility of the component (b) with the component (a) and the optical and mechanical characteristics of a film made of the composition, the content of the component (b) in the cellulose ester composition is limited to 99 to 1% by weight, preferably 90 to 1% by weight, particularly preferably 70 to 5% by weight, still preferably 60 to 5% by weight.

The cellulose ester composition of the present invention may further contain a plasticizer for the purposes of improving the mechanical characteristics and enhancing the drying rate. Such a plasticizer includes phosphoric acid esters and carboxylic acid esters. Examples of the phosphoric acid esters include triphenyl phosphate (TPP) and tricresyl phosphate (TCP), while those of the carboxylic acid esters include phthalates such as dimethyl phthalate (DMP), diethyl phthalate (DEP), dibutyl phthalate (DBP), dioctyl phthalate (DOP) and diethylhexyl phthalate (DEHP); citrates such as O-acetylcitric acid triethyl ester (OACTE) and O-acetylcitric acid tributyl ester (OACTB); and other carboxylic acid esters such as butyl oleate, acetylricinoleic acid methyl ester, dibutyl sebacate and trimellitates. Among these plasticizers, phthalates are preferable, with diethyl phthalate being particularly preferable.

The amount of the plasticizer to be used is preferably 0.1 to 40% by weight, particularly preferably 0.5 to 25% by weight based on the total amount of the components (a) and (b).

The cellulose ester composition of the present invention may further contain other components, as long as the object of the present invention is not impaired. Such components include deterioration inhibitors, ultraviolet inhibitors, colorants such as pigments, inorganic fines for enhancing the bulk specific gravity, and so on.

Next, an explanation will be made on the liquid cellulose ester composition of the present invention. The liquid cellulose ester composition is one prepared by dissolving the above cellulose ester composition in an organic solvent.

The organic solvent to be used includes ketones, esters and ethers substantially free from halogens, among which, ketones having 3 to 12 carbon atoms, esters having 3 to 12 carbon atoms and ethers having 3 to 12 carbon atoms are preferable. The ketones, esters or ethers may each have two or more functional groups (i.e., —CO, —COO— or —O—), or alternatively they may have other functional groups such as an alcoholic hydroxyl. With respect to such a solvent having two or more functional groups, it is preferable that the number of carbon atoms fall within the range as specified above for a solvent having either of the functional groups. The term "substantially halogen-free" used in this specification refers to having a halogen content of less than 5% by weight, preferably less than 2% by weight.

Examples of the ketones having 3 to 12 carbon atoms include acetone, methyl ethyl ketone, diethyl ketone, diisobutyl ketone, cyclohexanone and methylcyclohexanone. Examples of the esters having 3 to 12 carbon atoms include ethyl formate, propyl formate, pentyl formate, methyl acetate, ethyl acetate and pentyl acetate. Examples of the ethers having 3 to 12 carbon atoms include diisopropyl ether, dimethoxymethane, dimethoxyethane, 1,4-dioxane, 1,3-dioxolane, tetra-hydrofuran, anisole and phenetole. Examples of the organic solvents having two or more functional groups include 2-ethoxyethyl acetate, 2-methoxyethanol and 2-butoxyethanol.

Another solvent may be used simultaneously with the above organic solvent, including nitromethane, and $C_1$–$C_6$ alcohols such as methanol, ethanol, propanol, isopropanol, 1-butanol, t-butanol, 2-methyl-2-butanol and cyclohexanol. When the other solvent is used simultaneously with the ketone, ester or ether, it is desirable that the ketone, ester, or ether accounts for 10 to 99.5% by weight, particularly desirably 20 to 99% by weight, more desirably 40 to 98.5% by weight, most preferably 60 to 98% by weight of the total amount of the organic solvents.

From the standpoint of the easiness in film formation by solvent-casting, it is preferable that the concentration of the components (a) and (b) in the liquid cellulose ester composition be 5 to 50% by weight, particularly preferably 7 to 40% by weight.

Next, the process for preparing the liquid cellulose ester composition according to the present invention will be explained by referring to an example. First, the above cellulose ester composition is added to an organic solvent at room temperature under stirring in portions to form a slurry. In this step, the concentration of the cellulose ester composition in the slurry is adjusted to 10 to 40% by weight, preferably 10 to 30% by weight. When a plasticizer or other component is used, it may be added in this step. Then, the slurry is kept at −110 to 20° C. In this stage, the solvent penetrates translucent-white insolubles to form bubbles, and then the slurry turns colorless transparent. Then, the resulting slurry is kept at a temperature which is higher than the temperature employed in the preceding step and falls within the range of 0 to 120° C. to dissolve the slurry. Thus, a liquid cellulose ester composition according to the present invention is obtained.

In the above process, the use of a closed vessel as the reactor is preferable to avoid the contamination with water due to moisture condensation occurring in the cooling step. Further, the preparation time may be shortened by using a pressure vessel and pressuring the vessel in the cooling step and/or evacuating it in the heating step.

Next, explanation will be made on the production of a cellulose ester film according to the present invention. Conventional solvent casting processes can be employed in the production method. Examples of such processes include a process which comprises casting a liquid cellulose ester composition on a glass plate, subjecting the resulting glass plate to air drying and peeling the formed film from the glass plate; and a process which comprises casting a liquid cellulose ester composition on a substrate such as a polished drum or band, subjecting the resulting substrate to drying to evaporate away the organic solvent and peeling the formed film from the substrate. Further, the production may be conducted also by a process as described in JP-B 5-17844, column 4, line 19 to column 5, line 20, which comprises casting a high-concentration dope on a cooled drum to thereby shorten the time interval between the casting and the peeling.

The liquid cellulose ester composition has an excellent formability into a film, so that the production of a film from the composition can be conducted at the ordinary room temperature of factories, e.g., at about 10 to 30° C., without particular consideration to seasonal and regional temperature changes.

The drying method is not particularly limited and may be any means which can remove the organic solvent. For example, it may be conducted at 20 to 250° C., preferably 30 to 200° C. under a normal or reduced pressure.

The thickness of the film can be properly changed in accordance with the purpose of use, though it is generally about 0.1 to 250 μm. For example, the thickness may be adjusted to about 0.1 to 3 μm for optical thin films for protecting IC masks, while it maybe adjusted to about 10 to 50 μm for wrapping films. Further, it may be adjusted to about 50 to 250 μm for photographic or optical materials.

Further, cellulose ester fibers can be also produced by using the liquid cellulose ester composition. The production of such cellulose ester fibers can be conducted by known dry or wet spinning processes. The drying of such fibers may be conducted by the methods as described above for the film.

The fineness of the cellulose ester fibers is preferably 1 to 16 denier, particularly preferably 1 to 10 denier, still preferably 2 to 8 denier. The crosssectional contour of the fibers is not particularly limited, but may be selected from among circular, ellipsical, and modified shapes (such as shapes of "Y", "X", "I" and "R"). Alternatively, the fibers may have irregular cross sections or be hollow ones.

EXAMPLE

Figure 1:
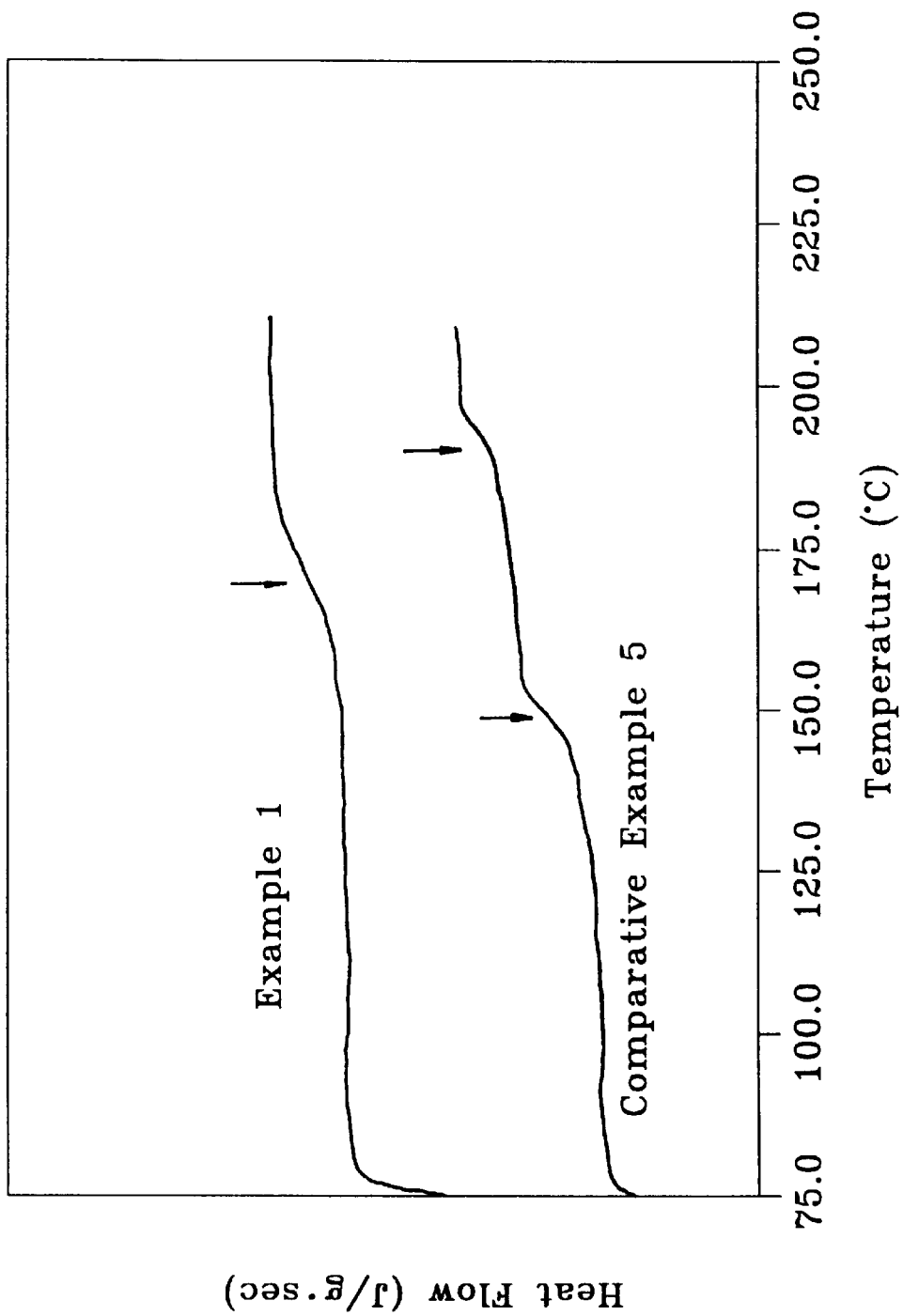
FIG. 1 shows the results of DSC.

The present invention will now be described in more detail by referring to Examples, though the present invention is not limited by them. The measured values given in the Examples were determined by the following methods.

(1) Degrees of Substitution of Cellulose Ester 70 ml of acetone and 30 ml of dimethyl sulfoxide were added to 1.9 g of dry cellulose ester weighed accurately. The obtained mixture was dissolved, followed by the addition of 50 ml of acetone. 30 ml of a 1N aqueous solution of sodium hydroxide was added to the mixture prepared above under stirring to conduct saponification for 2 hours. 100 ml of boiling water was added to the flask to wash the side wall thereof. The resulting mixture was titrated with 1N sulfuric acid by using phenolphthalein as the indicator. Separately, a blank test was conducted in a similar manner to the one described above.

After the completion of the titration, the supernatant was diluted 100 times and examined for the composition of organic acids by ion chromatography. The degrees of substitution were calculated based on the results of the titration and the acid composition determined by ion chromatography according to the following formulae:

$$TA = (B-A) \times F/(1000 \times W)$$

$$DSace = (162.14 \times TA)/[1 - 42.14 \times TA + (1 - 56.06 \times TA) \times (AL/AC)]$$

$$DSpro = DSace \times (AL/AC)$$

A: Quantity (ml) of 1N sulfuric acid consumed for the neutralization of a sample B: Quantity (ml) of 1N sulfuric acid consumed for the neutralization of a blank F: Titer of 1N sulfuric acid W: Weight (g) of a sample TA: Total organic acid content (mol/g)

AL/AC: Mole ratio of propionic acid (AL) to acetic acid (AC) as determined by ion chromatography DSace: degree of substitution with acetyl DSpro: degree of substitution with propionyl (DSpro=DSacyl)

(2) Number-average Molecular Weight of Cellulose Ester

The number-average molecular weight of each cellulose ester was determined by the use of a high-performance liquid chromatography system provided with a gel filtration column to which a detector for refractive index and low angle laser light scattering was connected (i.e., GPC-LALLS). The conditions of measurement are as follows:

Solvent: methylene chloride
Column: GMHXL (a product of Tosoh Corp.)
Concn. of sample: 0.1 w/v %
Flow rate: 1.0 ml/min
Amt. of sample injected: 300 μl
Reference: polymethyl methacrylate (MW: 218,600)
Temp.: 24° C.

(3) Compatibility of Cellulose Ester Composition
① Visual observation method

A solution of a cellulose ester composition in an organic solvent (i.e., a liquid cellulose ester composition) was allowed to stand for one week and then examined for compatibility, i.e., whether the composition suffered liquid/liquid separation or not.

② Thermal analysis method

A solution of a cellulose ester composition in an organic solvent (i.e., a liquid cellulose ester composition) was cast on a glass plate and air-dried. Then, the filmlike sample thus formed was further vacuum-dried at 105° C. for 3 hours and examined for glass transition behavior by differential scanning calorimetry (DSC) to determine whether the glass transition behavior was single (1: compatible) or separated (2: incompatible). The conditions of DSC are as follows:

Equipment: differential scanning calorimeter, DSC-7, mfd. by The Perkin Elmer Corp.
Atmosphere of measurement: nitrogen
Temp. rise rate: 20° C./min
Temp. range of measurement: 70 to 210° C.
Temp. calibration: two-point calibration
  In: melting point: 156.60° C.
  Sn: melting point: 231.88° C.
Calibration of quantity of heat: one-point calibration
  In: heat of fusion: 28.45 J/g (4) Retardation (Re) Value of Cellulose Ester Film The Re value is defined by the following formula;

$$Re = |n_x - n_y| \times d$$

in which each of $n_x$ and $n_y$ is a principal refractive index measured by Light of wavelength of 632.8 nm in plane of the film; and d is the thickness of the film.

The Re value can be obtained by incident light along a perpendicular direction to the film surface, by using an ellipsometer (AEP-100, mfd. by Shimadzu Corp.)

(5) Dynamic Viscoelasticity of Cellulose Ester Film

The dynamic viscoelasticity of a film was determined by using automatic dynamic viscoelasticity measuring equipment for solids (RSA-II; mfd. by Rheometrics). A sample film (thickness: about 100 μm) was cut into strips 2 mm in width and 35 mm in length. The strip was fixed at both its ends and a forced vibration was applied to the strip thus fixed to determine the stress-strain characteristics. The dynamic viscoelasticity of the sample was evaluated on the basis of the characteristics. The temperature of measurement was 26° C., and the frequency thereof was 10 Hz. The measurement was conducted in nitrogen gas.

Example 1

90 parts by weight of methyl acetate was mixed with 5 parts by weight of cellulose triacetate (DSace: 2.87, number-average degree of polymerization: 407, number-average molecular weight: 115,000)(hereinafter abbreviated to "CTA-1") and 5 parts by weight of cellulose acetate propionate (DSace: 2.60, DSpro: 0.30, number-average degree of polymerization: 439, number-average molecular weight: 126,000) (hereinafter abbreviated to "CAP-1") at room temperature (25° C.) to prepare a slurry having a polymer concentration (which refers to a total concentration of cellulose triacetate and cellulose acetate propionate, the same applies hereinafter) of 10% by weight. This slurry contained white insolubles. The slurry was cooled for one hour in a methanol bath adjusted to −20° C. with dry ice. No white insolubles were observed in the slurry taken out of the bath, while many bubbles formed by the penetration of the solvent were observed. The slurry was allowed to stand at room temperature for 10 minutes and then kept in a hot water bath set at 40° C. for 10 minutes to give a liquid cellulose ester composition. The composition exhibited fluidity and was free from undissolved lumps. The liquid cellulose ester composition was allowed to stand at room temperature for one week. No change was observed in the appearance of the composition. The liquid cellulose ester composition was cast on a glass plate and air-dried at 25° C. to give a film. This film could be easily peeled from the glass plate after the lapse of 30 minutes from the casting. The film was subjected to the above DSC. FIG. 1 shows the result.

Example 2

90 parts by weight of methyl acetate was mixed with 5 parts by weight of CTA-1 and 5 parts by weight of cellulose acetate propionate (DSace: 2.31, DSpro: 0.61, number-average degree of polymerization: 737, number-average molecular weight: 212,000)(hereinafter abbreviated to "CAP-2") at room temperature (25° C.) to prepare a slurry having a polymer concentration of 10% by weight. This slurry contained white insolubles. The slurry was cooled for one hour in a methanol bath adjusted to −15° C. with dry ice. No white insolubles were observed in the slurry taken out of the bath, while many bubbles formed by the penetration of the solvent were observed. The slurry was allowed to stand at room temperature for 10 minutes and then kept in a hot water bath set at 40° C. for 10 minutes to give a liquid cellulose ester composition. The composition exhibited fluidity and was free from undissolved lumps. The liquid cellulose ester composition was allowed to stand at room temperature for one week. No change was observed in the appearance of the composition.

Example 3

90 parts by weight of methyl acetate was mixed with 5 parts by weight of cellulose triacetate (DSace: 2.75, number-average degree of polymerization: 389, number-average molecular weight: 108,000)(hereinafter abbreviated to "CTA-2") and 5 parts by weight of CAP-1 at room temperature (25° C.) to prepare a slurry having a polymer concentration of 10% by weight. This slurry contained white insolubles. The slurry was cooled for one hour in a methanol bath adjusted to 0° C. with dry ice. No white insolubles were observed in the slurry taken out of the bath, while many bubbles formed by the penetration of the solvent were observed. The slurry was allowed to stand at room temperature for 10 minutes and then kept in a hot water bath set at 40° C. for 10 minutes to give a liquid cellulose ester composition. The composition exhibited fluidity and was free from undissolved lumps. The liquid cellulose ester composition was allowed to stand at room temperature for one week. No change was observed in the appearance of the composition.

Example 4

90 parts by weight of methyl acetate was mixed with 5 parts by weight of CTA-2 and 5 parts by weight of CAP-2 at room temperature (25° C.) to prepare a slurry having a polymer concentration of 10% by weight. This slurry contained white insolubles. The slurry was cooled for one hour in a methanol bath adjusted to 0° C. with dry ice. No white insolubles were observed in the slurry taken out of the bath, while many bubbles formed by the penetration of the solvent were observed. The slurry was allowed to stand at room temperature for 10 minutes and then kept in a hot water bath set at 40° C. for 10 minutes to give a liquid cellulose ester composition. The composition exhibited fluidity and was free from undissolved lumps. The liquid cellulose ester composition was allowed to stand at room temperature for one week. No change was observed in the appearance of the composition.

Comparative Example 1

90 parts by weight of methyl acetate was mixed with 5 parts by weight of cellulose acetate (DSace: 2.45, number-average degree of polymerization: 1434, number-average molecular weight: 380,000)(hereinafter abbreviated to "CDA-1") and 5 parts by weight of CAP-1 at room temperature (25° C.) to prepare a slurry having a polymer concentration of 10% by weight. This slurry contained white insolubles. The slurry was cooled for one hour in a methanol bath adjusted to 0° C. with dry ice. No white insolubles were observed in the slurry taken out of the bath, while many bubbles formed by the penetration of the solvent were observed. The slurry was allowed to stand at room temperature for 10 minutes and then kept in a hot water bath set at 40° C. for 10 minutes to give a liquid cellulose ester composition. The composition exhibited fluidity and was free from undissolved lumps. The liquid cellulose ester composition was allowed to stand at room temperature for one week. The composition suffered liquid/liquid phase separation.

Comparative Example 2

90 parts by weight of methyl acetate was mixed with 5 parts by weight of CTA-1 and 5 parts by weight of a commercially available cellulose acetate propionate ("Cellidore™" (trade name), a product of Bayer AG., DSace: 0.32, DSpro: 2.32, number-average degree of polymerization: 718, number-average molecular weight: 219,000) (hereinafter abbreviated to "CAP-3") at room temperature (25° C.) to prepare a slurry having a polymer concentration of 10% by weight. This slurry contained white insolubles. The slurry was cooled for one hour in a methanol bath adjusted to −20° C. with dry ice. No white insolubles were observed in the slurry taken out of the bath, while many bubbles formed by the penetration of the solvent were observed. The slurry was allowed to stand at room temperature for 10 minutes and then kept in a hot water bath set at 40° C. for 10 minutes to give a liquid cellulose ester composition. The composition exhibited fluidity and was free from undissolved lumps. The liquid cellulose ester composition was allowed to stand at room temperature for one week. The composition suffered liquid/liquid phase separation.

Comparative Example 3

90 parts by weight of methyl acetate was mixed with 5 parts by weight of CTA-2 and 5 parts by weight of CAP-3 at room temperature (25° C.) to prepare a slurry having a polymer concentration of 10% by weight. This slurry contained white insolubles. The slurry was cooled for one hour in a methanol bath adjusted to 0° C. with dry ice. No white insolubles were observed in the slurry taken out of the bath, while many bubbles formed by the penetration of the solvent were observed. The slurry was allowed to stand at room temperature for 10 minutes and then kept in a hot water bath set at 40° C. for 10 minutes to give a liquid cellulose ester composition. The composition exhibited fluidity and was free from undissolved lumps. The liquid cellulose ester composition was allowed to stand at room temperature for one week. The composition suffered from liquid/liquid phase separation.

Comparative Example 4

90 parts by weight of methyl acetate was mixed with 5 parts by weight of CDA-1 and 5 parts by weight of CAP-2 at room temperature (25° C.) to prepare a slurry having a polymer concentration of 10% by weight. This slurry was being allowed to stand at room temperature. The solution thus obtained was allowed to stand at room temperature for one week. The solution suffered liquid/liquid phase separation.

Comparative Example 5

90 parts by weight of methyl acetate was mixed with 5 parts by weight of CDA-1 and 5 parts by weight of CAP-3 at room temperature (25° C.) to prepare a slurry having a polymer concentration of 10% by weight. This slurry was dissolved by being allowed to stand at room temperature. The solution thus obtained was allowed to stand at room temperature for one week. The solution suffered liquid/liquid phase separation. A film was formed from the solution and examined by DSC described above. The result is given in FIG. 1.

TABLE 1

|  |  | Ex. | | | | Comp. Ex. | | | | |
| --- | --- | --- | --- | --- | --- | --- | --- | --- | --- | --- |
|  |  | 1 | 2 | 3 | 4 | 1 | 2 | 3 | 4 | 5 |
| Component (a) |  | CTA-1 | CTA-1 | CTA-2 | CTA-2 | CDA-1 | CTA-1 | CTA-2 | CDA-1 | CDA-1 |
| DSace |  | 2.87 | 2.87 | 2.75 | 2.75 | 2.45 | 2.87 | 2.75 | 2.45 | 2.45 |
| Component (b) |  | CAP-1 | CAP-2 | CAP-1 | CAP-2 | CAP-1 | CAP-2 | CAP-3 | CAP-2 | CAP-3 |
| (I) |  | 2.60 | 2.31 | 2.60 | 2.31 | 2.60 | 0.32 | 0.32 | 2.31 | 0.32 |
| (II) |  | 0.30 | 0.61 | 0.30 | 0.61 | 0.30 | 2.32 | 2.32 | 0.61 | 2.32 |
| (III) |  | 2.90 | 2.92 | 2.90 | 2.92 | 2.90 | 2.64 | 2.64 | 2.92 | 2.64 |
| Compatibility | visual observation | one phase | one phase | one phase | one phase | two phases | two phases | two phases | two phases | two phases |
|  | thermal analysis | 1 | 1 | 1 | 1 | 2 | 2 | 2 | 2 | 2 |

As is apparent from the results given in Table 1, the liquid cellulose ester compositions of Examples 1 to 4 were excellent in the compatibility of components (a) and (b) with each other and therefore did not suffer phase separation. As understood from FIG. 1, the film made from the liquid composition of Example 1 took a uniform one-phase state and therefore exhibited only one glass transition behavior (corresponding to the position marked by an arrow in the figure) On the other hand, the film made from the solution of Comparative Example 5 suffered phase separation and therefore exhibited two glass transition behaviors (corresponding to the positions marked by arrows in the figure). As apparent from the comparison of the Examples with the Comparative Examples, these results of the Examples are due to the degrees of substitution (e.g., DSace) of the components (a) and (b) falling in their respective specific ranges.

Example 5

85 parts by weight of methyl acetate was mixed with 7.5 parts by weight of CTA-2 and 7.5 parts by weight of CAP-2 at room temperature (25° C.) to prepare a slurry having a polymer concentration of 15% by weight. This slurry was cooled for one hour in a methanol bath adjusted to −20° C. with dry ice. The resulting slurry was allowed to stand at room temperature for 10 minutes and then kept in a hot water bath set at 40° C. for 10 minutes to give a liquid cellulose ester composition. This liquid cellulose ester composition was cast on a glass plate and air-dried at 25° C. to give a film. This film could be easily peeled from the glass plate after the lapse of 25 minutes from the casting. The film was vacuum-dried at 105° C. for 3 hours and then examined for Re value according to the above method. The result is given in Table 2.

Comparative Example 6

85 parts by weight of methyl acetate was mixed with 15 parts by weight of CTA-2 at room temperature (25° C.) to prepare a slurry having a polymer concentration of 15% by weight. This slurry was cooled for one hour in a methanol bath adjusted to −10° C. with dry ice. The resulting slurry was allowed to stand at room temperature for 10 minutes and then kept in a hot water bath set at 40° C. for 10 minutes to give a solution. This solution was cast on a glass plate, air-dried at 25° C., and vacuum-dried at 105° for 3 hours. The film thus obtained was examined for optical characteristics, Re value according to the above method. The result is given in Table 2.

TABLE 2

|  | Ex. 5 | Comp. Ex. 6 |
| --- | --- | --- |
| Component (a) | CTA-2 | CTA-2 |
| Dsace | 2.87 | 2.87 |
| Component (b) | CAP-2 | — |
| (I) | 2.31 | — |
| (II) | 0.61 | — |
| (III) | 2.92 | — |
| Re (nm) | 1.6 | 2.5 |

As apparent from the results given in Table 2, the film of Example 5 made from the liquid cellulose ester composition was superior to the cellulose triacetate film of Comparative Example 6 in optical characteristics.

Example 6

In a similar manner to that of Example 5, a film was made from a liquid cellulose ester composition prepared in a similar manner to that of Example 5. This film was examined for dynamic viscoelasticity according to the above method. The results are given in Table 3.

Comparative Example 7

15 parts by weight of CAP-2 was mixed with 85 parts by weight of methyl acetate at room temperature (25° C.) to prepare a slurry having a polymer concentration of 15% by weight. This slurry was dissolved by being allowed to stand at room temperature. The solution thus obtained was cast on a glass plate, air-dried at room temperature, and then vacuum-dried at 105° C. for 3 hours. The film thus obtained was examined for dynamic viscoelasticity according to the above method. The results are given in Table 3.

TABLE 3

|  | Ex. 6 | Comp. Ex. 7 |
| --- | --- | --- |
| Component (a) | CTA-2 | — |
| DSace | 2.87 | — |
| Component (b) | CAP-2 | CAP-2 |
| (I) | 2.31 | 2.31 |
| (II) | 0.51 | 0.61 |
| (III) | 2.92 | 2.92 |
| Storage modulus (× $10^9$ Pa) | 3.99 | 3.23 |
| Loss tangent (tan δ) | 0.030 | 0.031 |

As apparent from the results given in Table 3, the film of Example 6 made from the liquid cellulose ester composition was superior to the film of Comparative Example 7 made from a mixed ester of cellulose in mechanical characteristics.

Example 7

90 parts by weight of acetone was mixed with 5 parts by weight of CTA-1 and 5 parts by weight of CAP-1 at room temperature (25° C.) to prepare a slurry having a polymer concentration of 10% by weight. This slurry contained white insolubles. The slurry was cooled for one hour in a methanol bath adjusted to −20° C. with dry ice. No white insolubles were observed in the slurry taken out of the bath, while many bubbles formed by the penetration of the solvent were observed. The slurry was allowed to stand at room temperature for 10 minutes and then kept in a hot water bath set at 40° C. for 10 minutes to give a liquid cellulose ester composition. The composition exhibited fluidity and was free from undissolved lumps. The liquid cellulose ester composition was allowed to stand at room temperature for one week. No change was observed in the appearance of the composition.

Example 8

90 parts by weight of tetrahydrofuran was mixed with 5 parts by weight of CTA-1 and 5 parts by weight of CAP-1 at room temperature (25° C.) to prepare a slurry having a polymer concentration of 10% by weight. This slurry contained white or lumpish insolubles. The slurry was cooled for one hour in a methanol bath adjusted to −25° C. with dry ice. No white or lumpish insolubles were observed in the slurry taken out of the bath, while many bubbles formed by the penetration of the solvent were observed. The slurry was allowed to stand at room temperature for 10 minutes and then kept in a hot water bath set at 40° C. for 10 minutes to give a liquid cellulose ester composition. The composition exhibited fluidity and was free from undissolved lumps. The liquid cellulose ester composition was allowed to stand at room temperature for one week. No change was observed in the appearance of the composition.

Examples 9 to 13

At room temperature (25° C.), CTA-1 and CAP-1 were dissolved in methyl acetate or acetone at CTA-1/CAP-1 weight ratios of 90:10, 70:30, 50:50 (corresponding to Example 1 and so on), 30:70, and 10:90, and the obtained compositions were evaluated for compatibility. All of the compositions exhibited excellent compatibility both in the visual observation method and in the thermal analysis method. The films made from the compositions were nearly equivalent to those of the preceding Examples in mechanical and optical characteristics.

Example 14

68 parts by weight of methyl acetate was mixed with 7.5 parts by weight of CTA-2, 7.5 parts by weight of CAP-2 and 17 parts by weight of ethanol serving as a gelation accelerator at room temperature (25° C.) to prepare a slurry having a polymer concentration of 15% by weight. This slurry was cooled for one hour in a methanol bath adjusted to −25° C. with dry ice. The resulting slurry was allowed to stand at room temperature for 10 minutes, and then kept in a hot water bath set at 40° C. for 10 minutes to give a liquid cellulose ester composition. This liquid cellulose ester composition was cast on a glass plate and air-dried at 15° C. to give a film. This film could be easily peeled from the glass plate after the lapse of 18 minutes from the casting. Thus, the time required until peeling could be shortened as compared with the case where the air drying was conducted at 25° C.

The cellulose ester compositions of the present invention are easily soluble in general-purpose organic solvents and excellent in the compatibility of the cellulose components with each other, so that a liquid cellulose composition, prepared by dissolving the composition in an organic solvent can be easily solvent-cast into films. Further, the compositions are excellent also in formability into a film, so that the production of films from the compositions by the solvent-casting can be conducted at ordinary room temperatures of factories without particular consideration given to casting temperature, and that time required for film forming can be shortened. Additionally, the obtained films are free from phase separation and therefore have excellent optical and mechanical characteristics.

What is claimed is:

1. A cellulose ester composition comprising 1 to 99% by weight of (a) a cellulose triacetate prepared by substituting hydroxyl groups of cellulose with acetyl and having a degree of substitution with acetyl, DSace, which satisfies the relationship: $2.7 \leq DSace \leq 3.0$, and 99 to 1% by weight of (b) a mixed fatty acid ester of cellulose prepared by substituting hydroxyl groups of cellulose with acetyl and acyl groups having three or more carbon atoms and having degrees of substitution with the acetyl and acyl groups having three or more carbon atoms, respectively, DSace and DSacyl, which satisfy the relationships: (I) $2.20 \leq DSace \leq 2.95$, (II) $0.05 \leq DSacyl \leq 0.80$ and (III) $2.60 \leq DSace+DSacyl \leq 3.00$.

2. The composition as claimed in claim 1, wherein the acyl group having three or more carbon atoms is propionyl or butyryl.

3. The composition as claimed in claim 1, which further contains a plasticizer in an amount of 0.1 to 40% by weight based on the total amount of the components (a) and (b).

4. A liquid composition, prepared by dissolving the cellulose ester composition according to claim 1 in an organic solvent.

5. The liquid composition as claimed in claim 4, wherein the organic solvent is a ketone, an ester or an ether, and is substantially free from a halogen.

6. The liquid composition as claimed in claim 4, wherein the concentration of the components (a) and (b) is 5 to 50% by weight.

7. A process for preparing a liquid cellulose ester composition, comprising the steps of dispersing the cellulose ester composition according to claim 1 in an organic solvent, maintaining the obtained dispersion at a temperature of −110 to 20° C., and then maintaining the resulting dispersion at a temperature which is higher than the temperature employed in the preceding step and ranges from 0 to 120° C. to thereby dissolve the dispersion into a solution.

8. The process as claimed in claim 7, wherein the organic solvent is a ketone, an ester or an ether, and is substantially free from a halogen.

9. The process as claimed in claim 7, wherein the concentration of the components (a) and (b) in the liquid composition is 5 to 50% by weight.

10. A process for producing a cellulose ester film, comprising the step of casting the liquid composition according to claim 4 on a substrate and then removing the organic solvent through evaporation.

11. The composition as claimed in claim 1, wherein the cellulose triacetate is present in an amount of 30 to 95% by weight and the mixed fatty acid ester of cellulose is present in an amount of 70 to 5% by weight.

12. The composition as claimed in claim 11, wherein the cellulose triacetate is present in an amount of 40 to 95% by weight.

13. The composition as claimed in claim 11, wherein the mixed fatty acid ester of cellulose is present in an amount of 60 to 5% by weight.

14. The liquid composition of claim 5, wherein the organic solvent contains less than 2% by weight of a halogen.

* * * * *